Figure 3:
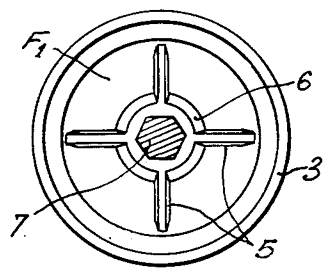

Jan. 9, 1962 J. MANTELET 3,016,075

CITRUS FRUIT REAMER

Filed Nov. 19, 1958 4 Sheets-Sheet 1

Inventor:
Jean Mantelet
by: Michael S. Striker
Attorney

CITRUS FRUIT REAMER
Filed Nov. 19, 1958 4 Sheets-Sheet 2
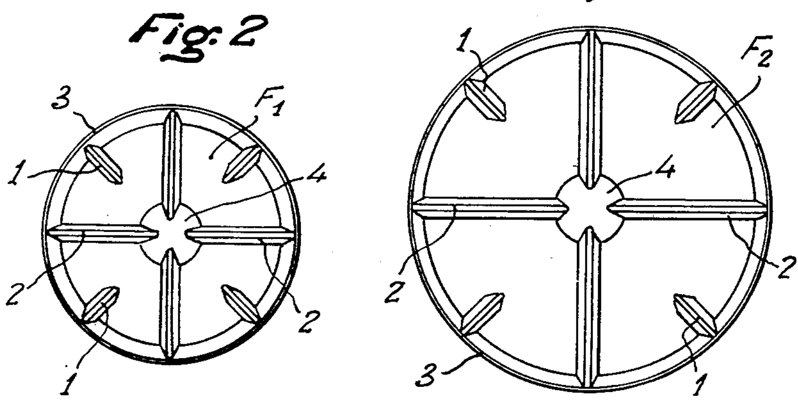
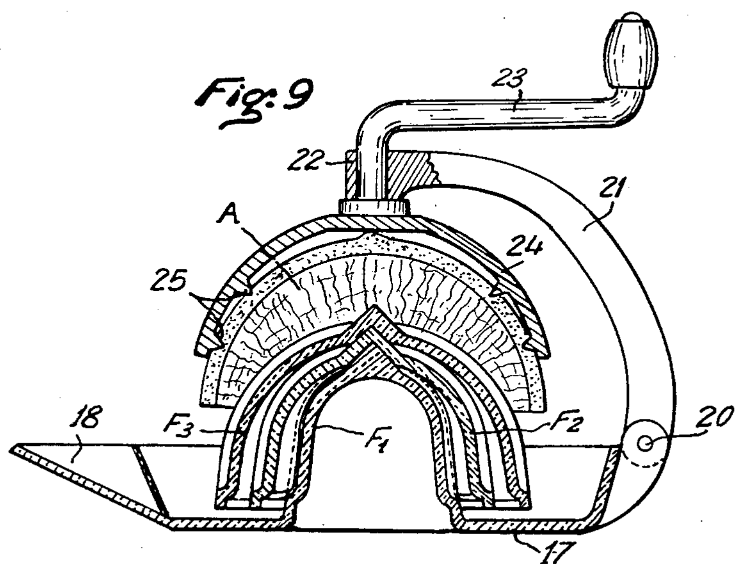
Inventor:
Jean Mantelet
by:
Michael S. Striker
Attorney

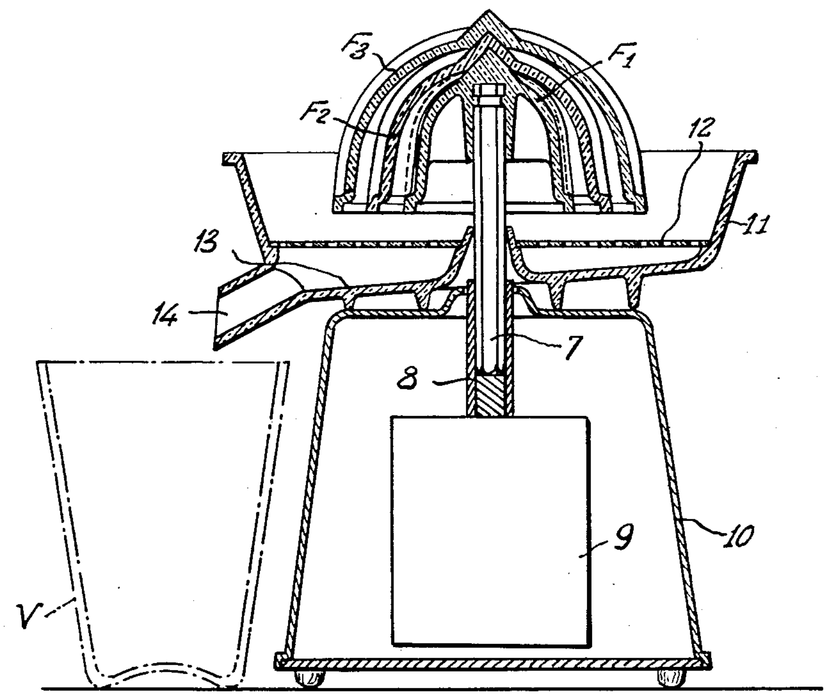
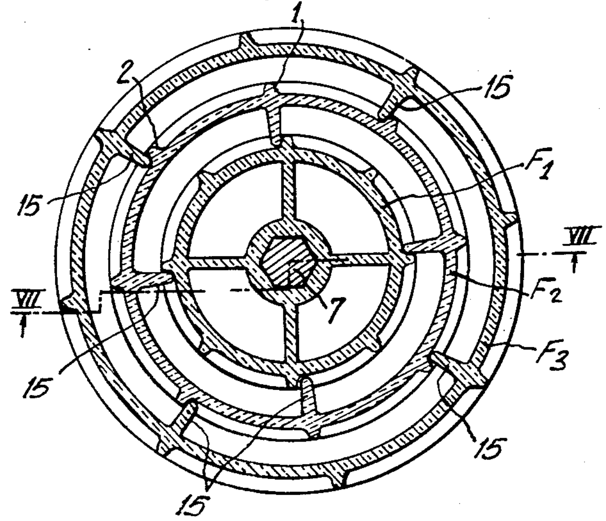
Inventor:
Jean Mantelet
by:
Michael S. Striker
Attorney

Jan. 9, 1962 J. MANTELET 3,016,075
CITRUS FRUIT REAMER
Filed Nov. 19, 1958 4 Sheets-Sheet 4
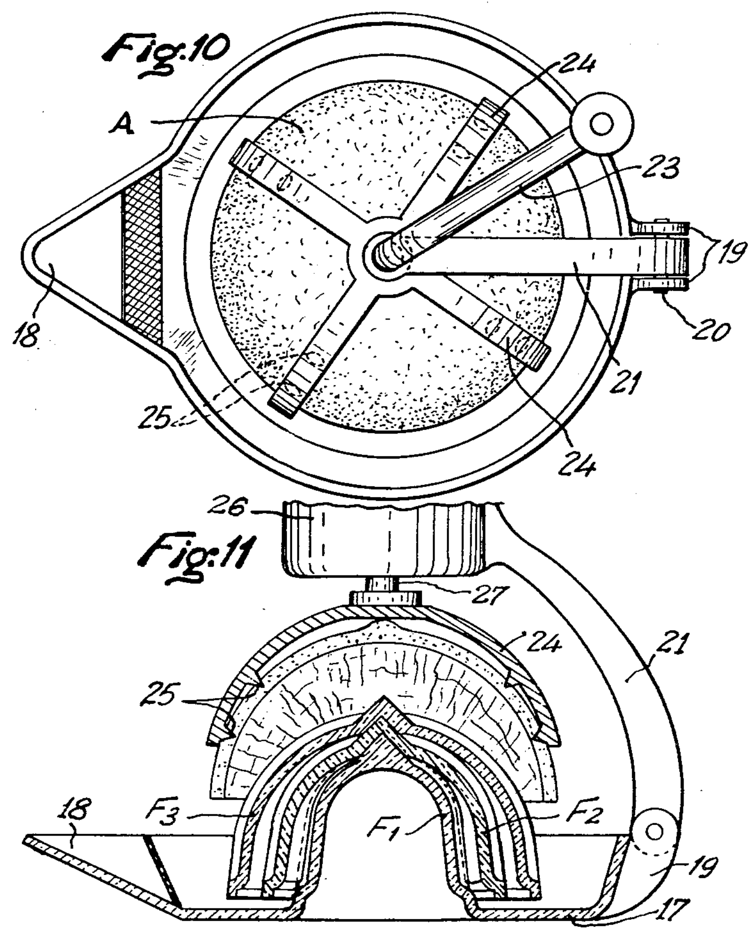
Inventor:
Jean Mantelet
by:
Michael S. Striker
Attorney United States Patent Office 3,016,075

Patented Jan. 9, 1962

1

3,016,075
CITRUS FRUIT REAMER

Jean Mantelet, 11 Rue Jules Ferry, Bagnolet, France

Filed Nov. 19, 1958, Ser. No. 775,057
Claims priority, application Luxembourg Sept. 30, 1958
12 Claims. (Cl. 146—3)

The present invention relates to squeezers for lemons, oranges, grapefruits and the like, namely for fruits of different sizes.

In known devices of this type, a motor rotatively drives a shaft which extends through a cup and comprises means for rotating a squeezing reamer selected among a plurality of reamers having dimensions corresponding to the sizes of the fruits to be squeezed, each half of the fruit being successively pressed by hand against the rotating reamer.

The member of the driving connection carried by the motor may be either male or female; as male it consists of a shaft protruding out of the casing and having at least one flat portion adapted to drive the associate female member carried by the reamers, however, the protruding shaft is dangerous to the user of the apparatus whose clothes run the risk of being pulled around said shaft. As female, though, this drawback may be removed by designing the driving member flush with the outer surface of the casing, but each reamer must have a male driving member consisting of a shaft having at least one flat portion.

In both aforesaid instances, when it is desired to substitute for a reamer another of different size, the apparatus has to be stopped and, then, started again and considerable time is therefore wasted.

One object of the invention is to provide a fruit squeezer which does not have the aforesaid drawbacks.

Another object of the invention is to provide a fruit squeezer in which a male driving member is provided on the reamer of smaller size only.

A further object of the invention is to provide a fruit squeezer the over-all dimensions of which is smaller than those of the conventional apparatus, when not in use.

With the above objects in view, the present invention includes in a squeezer a receptacle, a first bell-shaped reamer carried by said receptacle and having on its outer surface a plurality of squeezing ribs extending from the apex down to the rim thereof, at least one further bell-shaped reamer larger than said first reamer and adapted to fit over the other so that the outer reamer corresponds to the size of the fruit to be squeezed, each said further reamer having on its outer surface also a plurality of squeezing ribs extending from the apex down to the rim thereof and on its inner surface a plurality of driving webs adapted to engage tangentially the outer ribs of the ball-shaped reamer over which it is placed so as to immobilize said reamers in rotational direction relatively one to another, whereby relative axial pressure and rotational movement of half a fruit set over the outer reamer produces squeezing action and causes the fruit juice to flow down into said receptacle.

Figure 6:
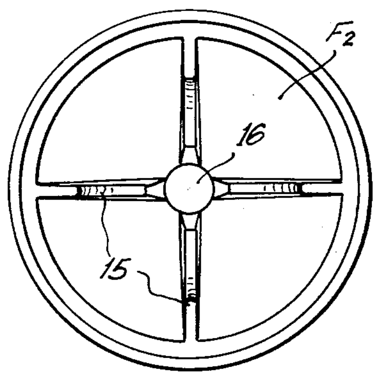
Figure 1:
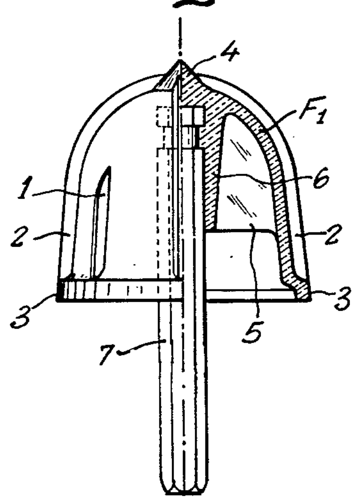
Figure 5:
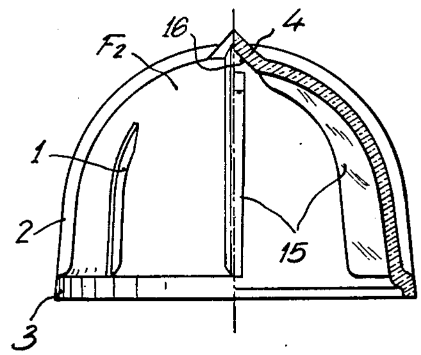

These and other objects of the invention will become apparent from the following description, taken in connection with the accompanying drawings in which:

FIG. 1 is a view, partly in section and partly in elevation, of a rotary reamer of smaller size according to the invention, FIGS. 2 and 3 are corresponding plan views seen from the top end and the bottom end respectively, FIGS. 4 to 6 are similar views representing the associated reamer of next larger size, FIG. 7 is a diagrammatical sectional view along VII—VII of FIG. 8 of a fruit squeezer with rotary reamers driven by a motor, FIG. 8 is a transverse sectional view of the three associated reamers mounted one in another, FIGS. 9 and 10 show in axial section and in plan view, respectively, a fruit squeezer according to the invention fitted with stationary reamers, FIG. 11 is a view similar to FIG. 9 showing a fruit squeezer similar to that of FIGS. 9 and 10 and driven by a motor.

The reamer F1 (FIGS. 1 to 3) comprises a bell shaped body having an outer convex surface of a predetermined radius of curvature, said outer surface being provided with two sets of four squeezing ribs 1 and 2, of triangular cross-section in this embodiment, and of uniform angular distribution in diametrical planes. Some of them, namely the ribs 1 extend from the rim 3 of the body upwardly to about half the height of said body, whereas the others, namely the ribs 2 extend over the full height of the body and merge into a centering co-axial conical portion or top projection 4 which forms a pivot. The rim or bottom free edge portion 3 is elevated with respect to the outer surface of the body.

The body of the reamer F1 is formed with a hub 6 rigid with a male driving member 7 which is hexagonal in cross-section in this embodiment and which is partly embedded in said hub when the body is being molded either by a thermosetting or an injection process. Reinforcing radial webs 5 are made integral with the body and the hub of the reamer. The longitudinal axis of the driving member 7 is the axis of symmetry of the reamer F1.

The male driving member 7 is adapted to engage a female member 8 (FIG. 7) which is driven by a motor 9. The motor is housed within a casing 10 and the driving member 8 is flush with the upper face of said casing in order to avoid any risk of casualty.

The fruit squeezer furthermore comprises a cup 11 with a strainer 12 adapted to retain the pips and the pulp and an inclined bottom 13 leading to a delivering spout 14 adapted to lead the fruit juice into a receptacle such as a glass V.

It should be noted that this preferred structure for driving the reamer, which is known in the art, could be replaced by a construction in which the reamer is rigid with a female driving member adapted to engage a male driving member rotatively driven by the motor.

The fruit squeezer, thus, is fitted with a reamer of a size corresponding to the size of the smaller citrus fruits to be squeezed, namely lemons.

In addition to this smaller size reamer, the apparatus also comprises a set of reamers of larger size corresponding to bigger fruits such as oranges and grapefruits. As a rule two additional reamers are necessary for squeezing oranges and grapefruits, respectively.

FIGS. 4 to 6 illustrate a reamer F2 of a size larger than that of the reamer F1 and adapted for squeezing oranges.

The outer shape of this reamer is identical with that of the reamer F1. The reamer F2 has an outer convex surface and also comprises both sets of squeezing ribs 1 and 2, the elevated rim 3 and the centering conical portion 4. The latter has an inner face formed with an axial conical recess 16 of the same included angle as the centering conical portion 4 of the reamer F1 and which it is adapted to receive, and also four driving webs 15 similarly distributed. The radial width of these webs is such that, upon the reamer F2 being placed over the reamer F1, they do not engage the outer surface of the latter, but they are able to engage the squeezing ribs of the latter laterally upon relative rotational movement, whereupon both reamers rotate as one. The height of the ribs is such that, after the centering conical portion 4 of the reamer F1 is engaged in the corresponding recess 16 of the reamer F2, the lower edges of the driving webs 15 of the reamer F2 engage the elevated rim 3 of the reamer F1.

By virtue of this disposition, the reamer F2 placed over the reamer F1 is automatically perfectly co-axially positioned with respect thereto.

FIG. 7 shows three reamers F1, F2, F3 successively placed upon one another for squeezing a grapefruit applied by hand against the reamer F3 with a sufficient pressure. FIG. 8 diagrammatically shows the manner in which the three reamers are made to rotate as one.

If it is desired to squeeze a fruit of smaller size, such as an orange for instance, it is sufficient to remove the reamer F3 without it being necessary to stop the motor; similarly a lemon may be squeezed by leaving only the reamer F1. Of course, fruits of successively increasing size may be squeezed by successively adding to the rotating reamer or reamers, a reamer of next larger size, without any need of stopping the motor.

This arrangement makes it possible to save time with respect to conventional fruit-squeezers with interchangeable reamers, which require stopping the motor to substitute the driving member of one reamer for that of another reamer, and then starting the motor again. In the case hereinabove contemplated of a male driving member rigid with the reamers, only a single driving member is required for a plurality of reamers thereby reducing material and labor costs.

The invention, which is essentially concerned with the rotational connection of the squeezing reamers by virtue of the cooperation of the squeezing ribs of each reamer with the driving ribs of the reamer of next larger size, is not limited to the embodiment hereinabove described in which the reamers are rotatably driven while the fruit is being applied axially thereto. It is also applicable to the reverse arrangement, that is to say to fruit squeezers in which the reamer or reamers are held stationary while the fruit is moved simultaneously in a rotational direction and in axial direction.

An obvious embodiment is that of the conventional fruit squeezer comprising a reamer rigidly connected to a cup having a spout and against which the fruit is manually pressed with the two aforesaid component movements. The reamer of smaller size which is rigidly connected to the cup and the larger size reamers have the structure hereinabove described, the latter being placed one on top of another as illustrated.

FIGS. 9 and 10 illustrate a fruit squeezer of this type i.e. with stationary reamers and in which the cup 17 with a spout 18 is rigidly connected to the reamer F1 on which two further reamers F2, F3 are shown fitted onto one another. Between the two branches of a yoke-piece 19 rigidly connected to the cup 17 is pivoted one end of a bent arm 21, by means of a pin 20. At the other end of arm 21 is a sleeve 22 in which is journalled one end of a crank 23. The crank 23 is attached to two bracing members 24 which are preferably resilient, have a curvature corresponding to that of the fruits of smaller size, and are provided with inner prongs 25 adapted to grip the fruit A. Rotating the handle of the crank while pressing downwardly thereagainst, causes the fruit A also to rotate against the reamers and, therefore, to be squeezed.

In the modification illustrated in FIG. 11, the arm 21 carries a motor 26 which is substituted for the handle of the aforesaid embodiment, the bracing members 24 being secured to the shaft 27 of the motor.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim is:

1. In a fruit squeezer, in combination, a first reamer having a first axis of symmetry, a first outer convex surface of a predetermined radius of curvature, a first top projection having a first outer face and extending from said first outer surface along said first axis, at least one first reaming rib having an outer edge portion of a second radius of curvature larger than said predetermined radius of curvature and extending downwards along said first outer surface; and a hollow cup shaped second reamer having a second axis of symmetry, a second outer convex surface, an inner concave surface of a radius of curvature larger than said second radius of curvature, a hollow second top projection extending along said second axis from said second outer convex surface and having an inner face adapted to encompass said first outer face of said first top projection, at least one second reaming rib extending downwards along said second outer convex surface, and at least one inner projection located on said inner concave surface adapted to engage said first reaming rib, whereby said second axis of symmetry will coincide with said first axis of symmetry when said second reamer is superimposed over said first reamer and rotation of said second reamer in relation to said first reamer is prevented in one direction when said second reamer is turned in said one direction until said one inner rib abuts against said first reaming projection.

2. In a fruit squeezer, in combination, a rotary first reamer having a first axis of symmetry, rotatable about said axis of symmetry, a first outer convex surface of a predetermined radius of curvature, a first top projection having a first outer face and extending from said first outer surface along said first axis, a plurality of first reaming ribs located on and extending downwardly along said first outer surface, and a plurality of additional first reaming ribs located on said first outer surface equidistantly between said first reaming ribs and extending downwardly along said first outer surface from an upper position further toward said top projection than said first reaming ribs, said first reaming ribs and said additional reaming ribs having outer edge portions of a second radius of curvature larger than said predetermined radius of curvature; and a hollow second reamer having a second axis of symmetry, a second outer convex surface, an inner concave surface of a radius of curvature larger than said second radius of curvature, a hollow second top projection extending along said second axis from said second outer convex surface and having an inner face adapted to encompass said first outer face of said first top projection, at least one second reaming rib extending downwardly along said second outer convex surface, and at least one inner projection located on said inner concave surface adapted to engage said first reaming rib, whereby said second axis of symmetry will coincide with said first axis of symmetry when said second reamer is superimposed over said first reamer and rotation of said second reamer in relation to said first reamer is prevented in one direction when said second reamer is turned in said one direction until said one inner projection abuts against said first reaming rib.

3. In a fruit squeezer, in combination, a first reamer having a first axis of symmetry, a first outer convex surface of a predetermined radius of curvature terminating in a first bottom free edge portion, a first top projection having a first outer face and extending from said first outer surface along said first axis, at least one first reaming rib having an outer edge portion of a second radius of curvature larger than said predetermined radius of curvature and extending along said first outer surface from said first bottom edge portion toward said first top projection, and an annular flange depending from said first bottom free edge and extending from said axis further than said outer convex surface; and a hollow second reamer having a second axis of symmetry, a second outer convex surface terminating in a second bottom free edge portion, an inner concave surface of a radius of curvature larger than said second radius of curvature, terminating in said second bottom edge portion, a hollow second top projection extending along said second axis from said second outer convex surface and having an inner face adapted to encompass said first outer face of said first top projection, at least one second reaming rib extending along said second outer convex surface from said second bottom free edge portion toward said second top projection, and at least one inner rib located on said inner concave surface extending from said second bottom free edge portion toward said second top projection and having an inner edge portion of a radius of curvature, larger than said predetermined radius of curvature but smaller than said second radius of curvature, whereby said second axis of symmetry will coincide with said first axis of symmetry when said second reamer is superimposed over said first reamer with said inner rib resting on said annular flange of said first reamer and rotation of said second reamer in relation to said first reamer is prevented in one direction when said second reamer is turned in said one direction until said one inner rib abuts against said first reaming rib.

4. In a fruit squeezer, in combination, a support; a first reamer having a first axis of symmetry mounted on said support, a first outer convex surface of a predetermined radius of curvature, a first top projection having a first outer face and extending from said first outer surface along said first axis, at least one first reaming rib having an outer edge portion of a second radius of curvature larger than said predetermined radius of curvature and extending downwardly along said first outer surface; and a hollow second reamer having a second axis of symmetry, a second outer convex surface, an inner concave surface of a radius of curvature larger than said second radius of curvature, a hollow second top projection extending along said second axis from said second outer convex surface and having an inner face adapted to encompass said first outer face of said first top projection, at least one second reaming rib extending downwardly along said second outer convex surface, and at least one inner projection located on said inner concave surface adapted to engage said first reaming rib, whereby said second axis of symmetry will coincide with said first axis of symmetry when said second reamer is superimposed over said first reamer and rotation of said second reamer in relation to said first reamer is prevented in one direction when said second reamer is turned in said one direction until said one inner projection abuts against said first reaming rib.

5. In a fruit squeezer, in combination, a support including a top wall having an aperture formed therein; rotating means located on said support below said top wall; a first rotary connecting member operatively connected with said rotating means for rotation therewith located on said support below said top wall; a first rotary reamer having an axis of symmetry and a second connecting member operatively engaging said first connecting member for rotation therewith, said first reamer including a first outer convex surface of a predetermined radius of curvature, a first top projection having a first outer face and extending from said first outer surface along said first axis, at least one first reaming rib having an outer edge portion of a second radius of curvature larger than said predetermined radius of curvature and extending downwardly along said first outer surface; and a hollow second reamer having a second axis of symmetry, a second outer convex surface, an inner concave surface of a radius of curvature larger than said second radius of curvature, a hollow second top projection extending along said second axis from said second outer convex surface and having an inner face adapted to encompass said first outer face of said first top projection, at least one second reaming rib extending downwardly along said second outer convex surface, and at least one inner projection located on said inner concave surface adapted to engage said first reaming rib, whereby said second axis of symmetry will coincide with said first axis of symmetry when said second reamer is superimposed over said first reamer and rotation of said second reamer in relation to said first reamer is prevented in one direction when said second reamer is turned in said one direction until said one inner projection abuts against said first reaming rib.

6. In a fruit squeezer, in combination, a support including a top wall having an aperture formed therein; rotating means located on said support below said top wall; a first rotary tubular connecting member operatively connected with said rotating means for rotation therewith located on said support below said top wall; a first rotary reamer having an axis of symmetry and an elongated second connecting member extending along said axis and located in the bore of said first rotary tubular connecting member operatively engaging said first connecting member for rotation therewith, said first reamer including a first outer convex surface of a predetermined radius of curvature, a first top projection having a first outer face and extending from said first outer surface along said first axis, at least one first reaming rib having an outer edge portion of a second radius of curvature larger than said predetermined radius of curvature and extending downwardly along said first outer surface; and a hollow second reamer having a second axis of symmetry, a second outer convex surface, an inner concave surface of a radius of curvature larger than said second radius of curvature, a hollow second top projection extending along said second axis from said second outer convex surface and having an inner face adapted to encompass said first outer face of said first top projection, at least one second reaming rib extending downwardly along said second outer convex surface, and at least one inner rib located on and extending upwardly along said inner concave surface toward said second top projection and having an inner edge portion of a radius of curvature larger than said predetermined radius of curvature but smaller than said second radius of curvature, whereby said second axis of symmetry will coincide with said first axis of symmetry when said second reamer is superimposed over said first reamer and rotation of said second reamer in relation to said first reamer is prevented in one direction when said second reamer is turned in said one direction until said one inner rib abuts against said first reaming rib.

7. In a fruit squeezer, in combination, a support including a top wall having an aperture formed therein; rotating means located on said support below said top wall; a first rotary connecting member operatively connected with said rotating means for rotation therewith located on said support below said top wall; a first rotary reamer having an axis of symmetry and a second connecting member operatively engaging said first connecting member for rotation herewith, said first reamer including a first outer convex surface of a predetermined radius of curvature, a first top projection having a first outer face and extending from said first outer surface along said first axis, at least one first reaming rib having an outer edge portion of a second radius of curvature larger than said predetermined radius of curvature and extending downwardly along said first outer surface, and a bottom annular flange extending outwardly from said outer convex surface; and a hollow second reamer having a second axis of symmetry, a second outer convex surface terminating in a bottom free edge portion, an inner concave surface of a radius of curvature larger than said second radius of curvature, a hollow second top projection extending along said second axis from said second outer convex surface and having an inner face adapted to encompass said first outer face of said first top projection, at least one second reaming rib extending along said second outer convex surface from said bottom free edge portion toward said second top projection, and at least one inner rib located on said inner concave surface extending from said bottom free edge portion toward said second top projection and having an inner edge portion of a radius of curvature, larger than said predetermined radius of curvature but smaller than said second radius of curvature, whereby said second axis of symmetry will coincide with said first axis of symmetry when said second reamer is superimposed over said first reamer with said inner rib resting on said annular flange of said first reamer and rotation of said second reamer in relation to said first reamer is prevented in one direction when said second reamer is turned in said one direction until said one inner rib abuts against said first reaming rib.

8. In a fruit squeezer, in combination, a support including a top wall having an aperture formed therein; motor means located on said support below said top wall; a first rotary connecting member operatively connected with said motor means for rotation therewith located on said support below said top wall; a first rotary reamer having an axis of symmetry and a second connecting member operatively engaging said first connecting member for rotation therewith, said first reamer including a first outer convex surface of a predetermined radius of curvature, a first top projection having a first outer face and extending from said first outer surface along said first axis, at least one first reaming rib having an outer edge portion of a second radius of curvature larger than said predetermined radius of curvature and extending downwardly along said first outer surface, and a bottom annular flange extending from said outer convex surface outwardly from said axis; and a hollow second reamer having a second axis of symmetry, a second outer convex surface terminating in a bottom free edge portion, an inner concave surface of a radius of curvature larger than said second radius of curvature, a hollow second top projection extending along said second axis from said second outer convex surface and having an inner face adapted to encompass said first outer face of said first top projection, at least one second reaming rib extending along said second outer convex surface from said bottom free edge portion toward said second top projection, and at least one inner rib located on said inner concave surface extending from said bottom free edge portion toward said second top projection and having an inner edge portion of a radius of curvature, larger than said predetermined radius of curvature but smaller than said second radius of curvature, whereby said second axis of symmetry will coincide with said first axis of symmetry when said second reamer is superimposed over said first reamer with said inner rib resting on said annular flange of said first reamer and rotation of said second reamer in relation to said first reamer is prevented in one direction when said second reamer is turned in said one direction until said one inner rib abuts against said first reaming rib.

9. In a fruit squeezer, in combination, a support, a first reamer having a first axis of symmetry mounted on said support, a first outer convex surface of a predetermined radius of curvature terminating in a first bottom free edge portion, a first top projection having first outer face extending from said first outer surface along said first axis, at least one first reaming rib having an outer edge portion of a second radius of curvature larger than said predetermined radius of curvature and extending along said first outer surface from said first bottom edge portion toward said first top projection; a hollow second reamer having a second axis of symmetry, a second outer convex surface terminating in a second bottom free edge portion, an inner concave surface of a radius of curvature larger than said second radius of curvature, terminating in said second bottom edge portion, a hollow second top projection extending along said second axis from said second outer convex surface and having an inner face adapted to encompass said first outer face of said first top projection, at least one second reaming rib extending along said second outer convex surface from said second bottom free edge portion toward said second top projection, and at least one inner rib located on said inner concave surface extending from said second bottom free edge portion toward said second top projection and having an inner edge portion of a radius of curvature, larger than said predetermined radius of curvature but smaller than said second radius of curvature; fruit holding means mounted on said support for movement to and from an operative position in which a fruit located in said fruit holding means is pressed against one of said reamers; and actuating means mounted on said support for rotating said fruit holding means, whereby said second axis of symmetry will coincide with said first axis of symmetry when said second reamer is superimposed over said first reamer and rotation of said second reamer in relation to said first reamer is prevented in one direction when said second reamer is turned in said one direction until said one inner rib abuts against said first reaming rib.

10. In a fruit squeezer, in combination, a support, a first reamer having a first axis of symmetry mounted on said support, a first outer convex surface of a predetermined radius of curvature terminating in a first bottom free edge portion, a first top projection having first outer face extending from said first outer surface along said first axis, at least one first reaming rib having an outer edge portion of a second radius of curvature larger than said predetermined radius of curvature and extending along said first outer surface from said first bottom edge portion toward said first top projection; a hollow second reamer having a second axis of symmetry, a second outer convex surface terminating in a second bottom free edge portion, an inner concave surface of a radius of curvature larger than said second radius of curvature, terminating in said second bottom edge portion, a hollow second top projection extending along said second axis from said second outer convex surface and having an inner face adapted to encompass said first outer face of said first top projection, at least one second reaming rib extending along said second outer convex surface from said second bottom free edge portion toward said second top projection, and at least one inner rib located on said inner concave surface extending from said second bottom free edge portion toward said second top projection and having an inner edge portion of a radius of curvature, larger than said predetermined radius of curvature but smaller than said second radius of curvature; fruit holding means mounted on said support for pivotal movement to and from an operative position in which a fruit located in said fruit holding means is pressed against one of said reamers, and actuating means mounted on said support for rotating said fruit holding means, whereby said second axis of symmetry will coincide with said first axis of symmetry when said second reamer is superimposed over said first reamer and rotation of said second reamer in relation to said first reamer is prevented in one direction when said second reamer is turned in said one direction until said one inner rib abuts against said first reaming rib.

11. In a fruit squeezer, in combination, a support, a first reamer having a first axis of symmetry mounted on said support, a first outer convex surface of a predetermined radius of curvature terminating in a first bottom free edge portion, a first top projection having first outer face extending from said first outer surface along said first axis, at least one first reaming rib having an outer edge portion of a second radius of curvature larger than said predetermined radius of curvature and extending along said first outer surface from said first bottom edge portion toward said first top projection; a hollow second reamer having a second axis of symmetry, a second outer convex surface terminating in a second bottom free edge portion, an inner concave surface of a radius of curvature larger than said second radius of curvature, terminating in said second bottom edge portion, a hollow second top projection extending along said second axis from said second outer convex surface and having an inner face adapted to encompass said first outer face of said first top projection, at least one second reaming rib extending along said second convex surface from said second bottom free edge portion toward said second top projection, and at least one inner rib located on said inner concave surface extending from said second bottom free edge portion toward said second top projection and having an inner edge portion of a radius of curvature, larger than said predetermined radius of curvature but smaller than said second radius of curvature; fruit holding means mounted on said support for pivotal movement to and from an operative position in which a fruit located in said fruit holding means is pressed against one of said reamers, and manually operated actuating means including an operating handle mounted on said support for rotating said fruit holding means, whereby said second axis of symmetry will coincide with said first axis of symmetry when said second reamer is superimposed over said first reamer and rotation of said second reamer in relation to said first reamer is prevented in one direction when said second reamer is turned in said one direction until said one inner rib abuts against said first reaming rib.

12. In a fruit squeezer, in combination, a support, a first reamer having a first axis of symmetry mounted on said support, a first outer convex surface of a predetermined radius of curvature terminating in a first bottom free edge portion, a first top projection having first outer face extending from said first outer surface along said first axis, at least one first reaming rib having an outer edge portion of a second radius of curvature larger than said predetermined radius of curvature and extending along said first outer surface from said first bottom edge portion toward said first top projection; a hollow second reamer having a second axis of symmetry, a second outer convex surface terminating in a second bottom free edge portion, an inner concave surface of a radius of curvature larger than said second radius of curvature, terminating in said second bottom edge portion, a hollow second top projection extending along said second axis from said second outer convex surface and having an inner face adapted to encompass said first outer face of said first top projection, at least one second reaming rib extending along said second outer convex surface from said second bottom free edge portion toward said second top projection, and at least one inner rib located on said inner concave surface extending from said second bottom free edge portion toward said second top projection and having an inner edge portion of a radius of curvature, larger than said predetermined radius of curvature but smaller than said second radius of curvature; fruit holding means mounted on said support for pivotal movement to and from an operative position in which a fruit located in said fruit holding means is pressed against one of said reamers, and motor operated actuating means mounted on said support for rotating said fruit holding means, whereby said second axis of symmetry will coincide with said first axis of symmetry when said second reamer is superimposed over said first reamer and rotation of said second reamer in relation to said first reamer is prevented in one direction when said second reamer is turned in said one direction until said one inner rib abuts against said first reaming rib.

References Cited in the file of this patent

UNITED STATES PATENTS

| | | |
|---|---|---|
| 1,698,860 | Ulrich | Jan. 15, 1929 |
| 1,977,011 | Orfanson | Oct. 16, 1934 |
| 2,133,756 | Rodgers | Oct. 18, 1938 |
| 2,822,562 | Shackleford | Feb. 11, 1958 |
| 2,845,824 | Wilson | Aug. 5, 1958 |

UNITED STATES PATENT OFFICE
CERTIFICATE OF CORRECTION

Patent No. 3,016,075 January 9, 1962

Jean Mantelet

It is hereby certified that error appears in the above numbered patent requiring correction and that the said Letters Patent should read as corrected below.

In the heading to the printed specification, line 5, for "Sept. 30, 1958" read -- Aug. 1, 1958 --.

Signed and sealed this 28th day of August 1962.

(SEAL)
Attest:

ESTON G. JOHNSON
Attesting Officer

DAVID L. LADD
Commissioner of Patents